United States Patent

Kotlyar

Patent Number: 5,383,351
Date of Patent: Jan. 24, 1995

[54] PUMP SEAL TEST APPARATUS AND METHOD

[75] Inventor: Michael Kotlyar, Rancho Palos Verdes, Calif.

[73] Assignee: Atlantic Richfield Company, Los Angeles, Calif.

[21] Appl. No.: 150,924

[22] Filed: Nov. 12, 1993

[51] Int. Cl.[6] .................. G01M 3/28; F04B 51/00
[52] U.S. Cl. ............................. 73/40; 73/46; 73/168
[58] Field of Search ............... 73/40, 46, 49.8, 168

[56] References Cited

U.S. PATENT DOCUMENTS

| | | | |
|---|---|---|---|
| 3,180,135 | 4/1965 | Cain, Jr. et al. | 73/46 |
| 3,683,673 | 8/1972 | Eichler et al. | 73/46 X |
| 4,197,531 | 4/1980 | Wentworth, Jr. | 73/40 X |
| 4,722,221 | 2/1988 | Ferguson | 73/168 |
| 4,766,765 | 8/1988 | Ezekoye | 73/46 X |

FOREIGN PATENT DOCUMENTS 1716194  2/1992  U.S.S.R. .......................... 73/168

*Primary Examiner*—Hezron E. Williams
*Assistant Examiner*—Joseph W. Roskos
*Attorney, Agent, or Firm*—Michael E. Martin

[57] ABSTRACT

Centrifugal pumps and similar fluid handling machines may be tested to detect leakage from shaft seal assemblies by an apparatus which includes a support flange for supporting a section of the pump casing including the seal assembly. The apparatus includes a housing portion with an interior chamber which may be placed in communication with a source of pressure fluid such as compressed air to act on the seal assembly to detect any fluid leakage therefrom. The apparatus includes a cylindrical support flange and removable adaptor plates which may be interchanged depending on the configuration of the pump casing.

5 Claims, 1 Drawing Sheet

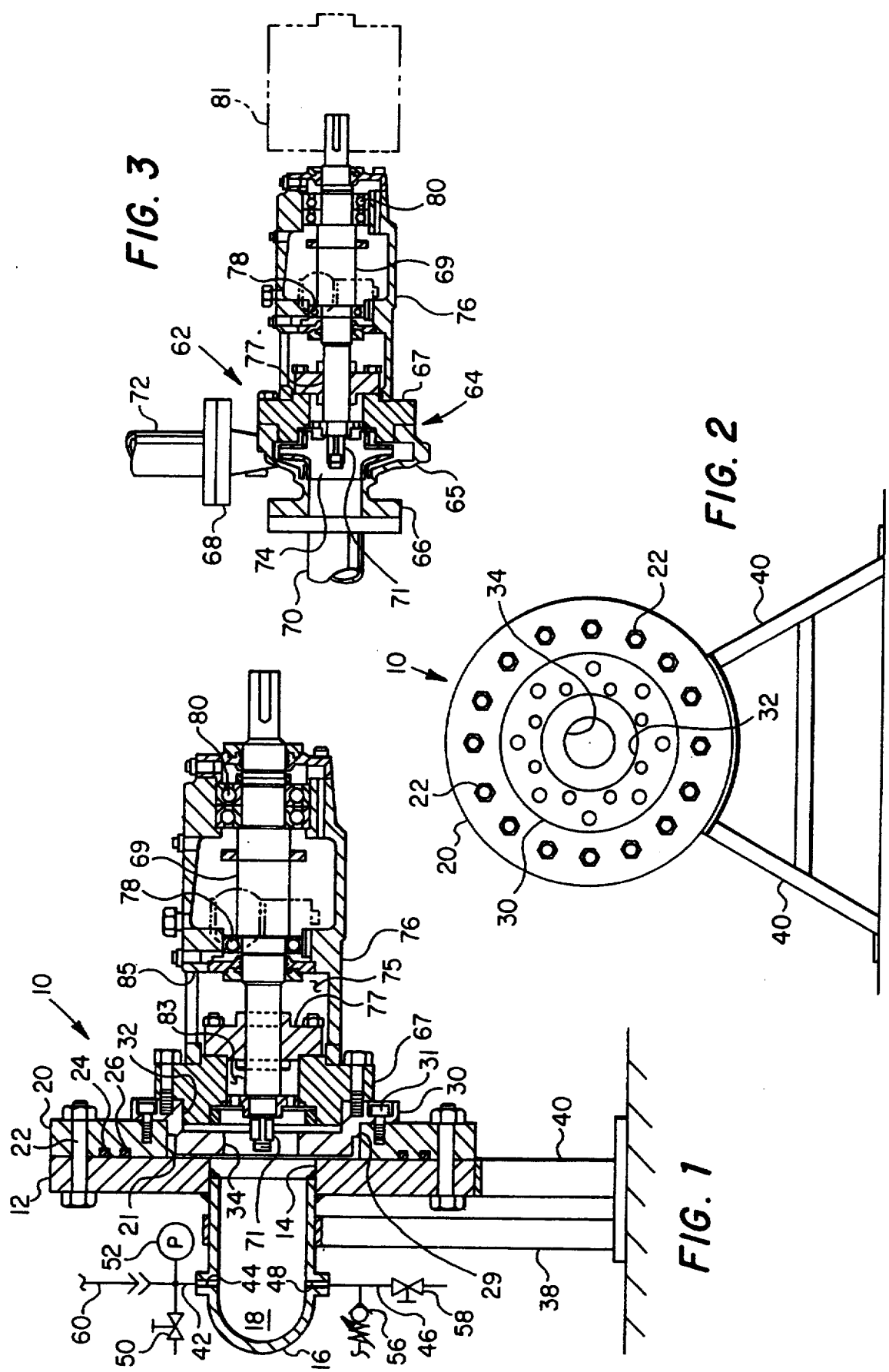

PUMP SEAL TEST APPARATUS AND METHOD

BACKGROUND OF THE INVENTION

1. Field of the Invention

The present invention pertains to an apparatus and method for testing pump seals, particularly positive or so-called mechanical seals and wherein substantial disassembly of the pump to perform the test procedure is not required.

2. Background

Certain types of machines such as fluid transfer and hydraulic pumps use a variety of seals including positive or so-called mechanical type seals to prevent leakage of fluid from the pump working parts to atmosphere or the pump's surrounding environment. In many applications of pumps, it is inconvenient to remove the pump from its operating position to perform tests on the seals to verify satisfactory operation. This seal test procedure is important and sometimes required where the associated pump or similar type of machine is operating with or on volatile or toxic fluids. The present invention overcomes several problems associated with prior art pump seal test methods.

SUMMARY OF THE INVENTION

The present invention provides a unique apparatus and method for testing shaft seals of pumps and similar fluid handling machines without requiring removal of the entire pump from its operating position and without requiring substantial disassembly of the pump.

In accordance with an important aspect of the invention, an apparatus is provided having a support flange for supporting a major portion of the casing of a fluid handling pump, which casing has supported therein a seal assembly whose operating condition is to be tested to verify that the seal assembly is preventing fluid leakage. The test apparatus includes a housing portion forming a chamber for receiving pressure test fluid as well as a shaft extension of the pump, or similar fluid handling machine, and an adaptor plate for supporting the pump. The adaptor plate may be removed and replaced by a similar adaptor plate for accommodating several different pump casing configurations.

In accordance with another aspect of the present invention, an improved method for testing seals of pumps and similar fluid handling machines is carried out wherein a major portion of the pump, including the seal assembly, is removed from the pump working position for support during the seal test process without requiring substantial disassembly of the pump and without disconnecting the part of the pump casing which is connected to the fluid system from the pump working position.

In accordance with yet a further aspect of the present invention an improved seal test apparatus and method is provided for centrifugal pumps which have a separable casing structure which includes a pump inlet flange, a fluid discharge passage portion and a discharge passage flange.

The above-noted advantages and superior features of the present invention, together with other important aspects thereof, will be further appreciated by those skilled in the art upon reading the detailed description which follows in conjunction with the drawing.

BRIEF DESCRIPTION OF THE DRAWING

FIG. 1 is a central longitudinal section view of the pump seal test apparatus of the present invention;

FIG. 2 is a front elevation of the apparatus illustrated in FIG. 1; and

FIG. 3 is a view illustrating a typical centrifugal pump installed in its working position.

DESCRIPTION OF A PREFERRED EMBODIMENT

In the description which follows, like parts are marked throughout the specification and drawing with the same reference numerals, respectively. The drawing figures are not necessarily to scale in the interest of clarity and conciseness.

Referring to FIGS. 1 and 2, there is illustrated a unique pump seal test apparatus, generally designated by the numeral 10. The apparatus 10 includes a generally cylindrical flange member 12 having a central bore portion 14 to which is connected a closed-end housing 16 defining an internal chamber 18 opening to the bore 14. The apparatus 10 further includes a second, generally cylindrical flange 20 which is suitably bolted to the flange 12 by a plurality of hex-head bolt and nut assemblies 22, as illustrated. Fluid tight seals such as conventional O-rings 24 and 26 minimize the surface area of the flanges exposed to high fluid pressures and prevent leakage of fluid from the chamber 18 to the exterior of the apparatus 10 between the flanges 12 and 20. The flange 20 also has a central, cylindrical bore 21 which is adapted to form a pilot bore for a cylindrical shoulder 29 of a generally cylindrical adaptor plate 30 which is suitably removably fastened to the flange 20 by plural threaded fasteners 31. The adaptor plate 30 includes a pilot bore portion 32 and a central bore 34 which is in communication with the chamber 18.

The apparatus 10 is suitably supported on pairs of depending support legs 38 and 40, as illustrated.

Pressure fluid may be admitted to the chamber 18 by way of a conduit 42 in communication with an inlet port 44 and fluid may be drained from the chamber 18 through a discharge conduit 46 in communication with a drain port 48. A suitable throttling valve 50 is in communication with conduit 42 and a pressure gauge 52 is also operably connected to the conduit 42 for sensing pressure within the chamber 18. A pressure relief valve 56 is suitably connected to the conduit 46 to limit the pressure in the chamber 18 and a manually actuated drain valve 58 is also interposed in the conduit 46. Pressure fluid, such as compressed air, may be communicated through the conduit 42 to the chamber 18 by way of a conventional quick disconnect coupling 60. The pressure in the chamber 18 may be adjusted by the valves 50 and/or 58 and read on the pressure gauge 52.

FIG. 3 shows one embodiment of a fluid handling machine which may be tested in accordance with the present invention comprising a centrifugal pump 62 having a radially split, single volute casing 64 having a first part 65 with a pump inlet flange 66 formed thereon as well as the pump volute and a discharge flange 68. The pump 62 is shown installed in a working position connected to an inlet conduit 70 and a discharge conduit 72 of a fluid process system, not shown. The casing 64 has a second part 67 which is suitably removably bolted to the casing part 65 and supports a pump drive shaft 69 having a centrifugal impeller 74 suitably removably mounted on a distal end 71 of the drive shaft, as shown.

Referring to FIG. 1, also, the fluid being pumped by the pump 62 is prevented from leaking into the interior space 75 of a third part 76 of the casing 64 by a seal assembly 77 suitably mounted on the casing 67. The seal assembly 77 is preferably a so-called mechanical face type to provide minimum fluid leakage. The third casing part 76 suitably supports the shaft 69 on spaced apart bearings 78 and 80. The shaft 69 may be directly coupled to a motor 81, FIG. 3, or other suitable drive means, not shown.

Prior art efforts to test pump seals such as the seal assembly 77 have involved removing the entire pump from the conduits 70, 72, assembling the pump 62 to a source of pressure fluid at the inlet flange 66 and the discharge flange 68 and pressurizing the interior of the casing part 65 to test the operation of the seal assembly 77. Removal of the casing part 65 is time consuming and often difficult to accomplish in a complex fluid process system. However, in accordance with the present invention, an apparatus and method have been developed wherein the casing part 65 may be left connected to the inlet and discharge conduits 70 and 72 and the casing parts 67 and 76 removed, in assembly, from the casing part 65 and mounted on the adaptor plate 30, after removal of the impeller 74 from the shaft 69. This mounting arrangement is illustrated in FIG. 1. Suitable gaskets may be interposed between the flange 20 and the plate 30 and between the plate 30 and the casing part 67, if needed, to minimize leakage of the seal test fluid.

After mounting the pump casing part 67, 76 on the apparatus 10 and bolting the casing part 67 to the adaptor plate 30, pressure fluid may be introduced into the chamber 18 to flow into the casing cavity 83 to act on the seal assembly 77 to test its fluid sealing capability. Since the casing part 76 includes one or more viewing ports 85, FIG. 1, leakage of pressure air into the space 75 may be detected. Moreover, if the pump 62 has been previously used, some small amount of liquid would usually remain in the cavity 83 and if this liquid is forced by pressure air to leak past the seal assembly 77 it will also be observed in the space 75, further indicating that the seal assembly needs to be replaced or repaired.

The foregoing description and illustration of the pump 62, having the particular configuration of casing part 67, is exemplary. Those skilled in the art will recognize that the adaptor plate 30 may be modified to include plural threaded bores forming bolt "circles" for supporting pump or similar fluid handling machine casings of different sizes and bolt circle patterns. Suitable adaptor plates for other pump casings may be provided for mounting on the flange 20 in place of the plate 30. Moreover, the adaptor plate 30 may be removed from the flange 20 and a pump casing mounted directly on the flange 20 if it has a bolt circle pattern matching the bolt circle pattern of the adaptor plate 30 or some other pattern provided on the flange 20. Still further, multiple bolt circle patterns may be provided in the flange 20 to accommodate different sizes and configurations of pump casings. Thanks to the arrangement of the housing portion 16 and the chamber 18, different shaft sizes and lengths may be accommodated or received within the chamber 18 when a particular pump casing is mounted on the apparatus 10.

The mechanical seal assembly 77 for the pump 62 may be tested to determine if it is fluid tight by removing, in assembly, the pump casing parts 67, 76 from the casing part 65 without unbolting the casing part 65 from the conduits 70 and 72. If the impeller 74 is too large in diameter and too wide to be received in the bore 32 of the adaptor plate 30, it may be removed from the shaft 69 so that the remainder of the pump 62 may be mounted on the adaptor plate, as illustrated in FIG. 1. The drive motor 81, for example, may or may not be left connected to the shaft 69, depending on the configuration of the mechanism for driving the shaft. When the pump casing parts 67, 76 are mounted on the apparatus 10 and secured thereto, the valve 58 may be closed and the chamber 18 placed in communication with a source of pressure fluid, such as compressed air, by connecting the quick disconnect coupling 60 to the conduit 42. The pressure of the fluid in the chamber 18 may be regulated by the throttling valve 50 while reading the gauge 52 and when the test pressure is reached, any leakage from the seal assembly 77 may be viewed through one or more of the ports 85. If seal leakage cannot be detected by use of compressed air, a suitable liquid may be introduced into the chamber 18 to flow into the cavity 83 whereupon, if the seal assembly 77 is not fluid tight, leakage will be easily detected.

Once the seal assembly 77 has been tested, the casing assembly 67, 76 may be removed from the adaptor plate 30, the impeller 74 replaced on the shaft 69 and the entire pump reassembled to the casing part 65 without disconnecting this casing part from the conduits 70 and 72. Accordingly, seal assemblies for pumps and other fluid handling machines may be easily tested without major disassembly and without removing the entire machine casing from its working position.

The apparatus 10 may be constructed using conventional engineering materials for fluid handling machines and support fixtures therefor.

Although preferred embodiments of the invention have been described in detail herein, those skilled in the art will recognize that various substitutions and modifications may be made to the apparatus and method without departing from the scope and spirit of the invention as recited in the appended claims.

What is claimed is:

1. Apparatus for testing seal assemblies for fluid handling machines such as pumps and the like comprising:
   a first generally cylindrical flange member and a housing part secured to said first flange member and forming an interior chamber;
   conduit means in communication with said housing part for introducing pressure fluid into said chamber;
   a second, generally cylindrical flange member adapted to be removably secured to said first flange member in fluid tight engagement therewith;
   means on said second flange member for supporting a casing of a fluid handling machine including a seal assembly supported in said casing; and
   means for regulating the pressure of pressure fluid introduced into said chamber to act on said seal assembly to test said seal assembly for fluid leakage therefrom.

2. A method for testing seal assemblies of fluid handling machines such as centrifugal pumps and the like, comprising:
   providing a seal testing apparatus characterized by a support flange for supporting at least part of a casing for a pump and a shaft seal in assembly with said casing part, housing means connected to said flange and forming an interior chamber for conducting pressure fluid to said casing part to act on said seal assembly, support means for said apparatus and means for conducting pressure fluid to said housing means to act on said seal assembly at a predetermined pressure to test said seal assembly for fluid leakage therefrom;

removing a pump from an operative position of said pump which includes a first casing part having a connection to a fluid inlet conduit and a connection to a fluid discharge conduit comprising the step of disconnecting a second casing part of said pump from said first casing part and including a seal assembly supported within said second casing part and;

mounting said second casing part including said seal assembly on said apparatus and introducing pressure fluid at a predetermined pressure into said second casing part to act on said seal assembly.

3. The method set forth in claim 2 including the step of:

demounting said second casing part from said apparatus and reconnecting said second casing part to said first casing part.

4. The method set forth in claim 2 wherein:

said pump includes a rotatable shaft and an impeller supported on said shaft and said method includes the step of removing said impeller from said shaft prior to mounting said second casing part on said apparatus.

5. The method set forth in claim 2 including the step of:

providing said pressure fluid as compressed air.

* * * * *